United States Patent Office 3,148,570
Patented Sept. 15, 1964

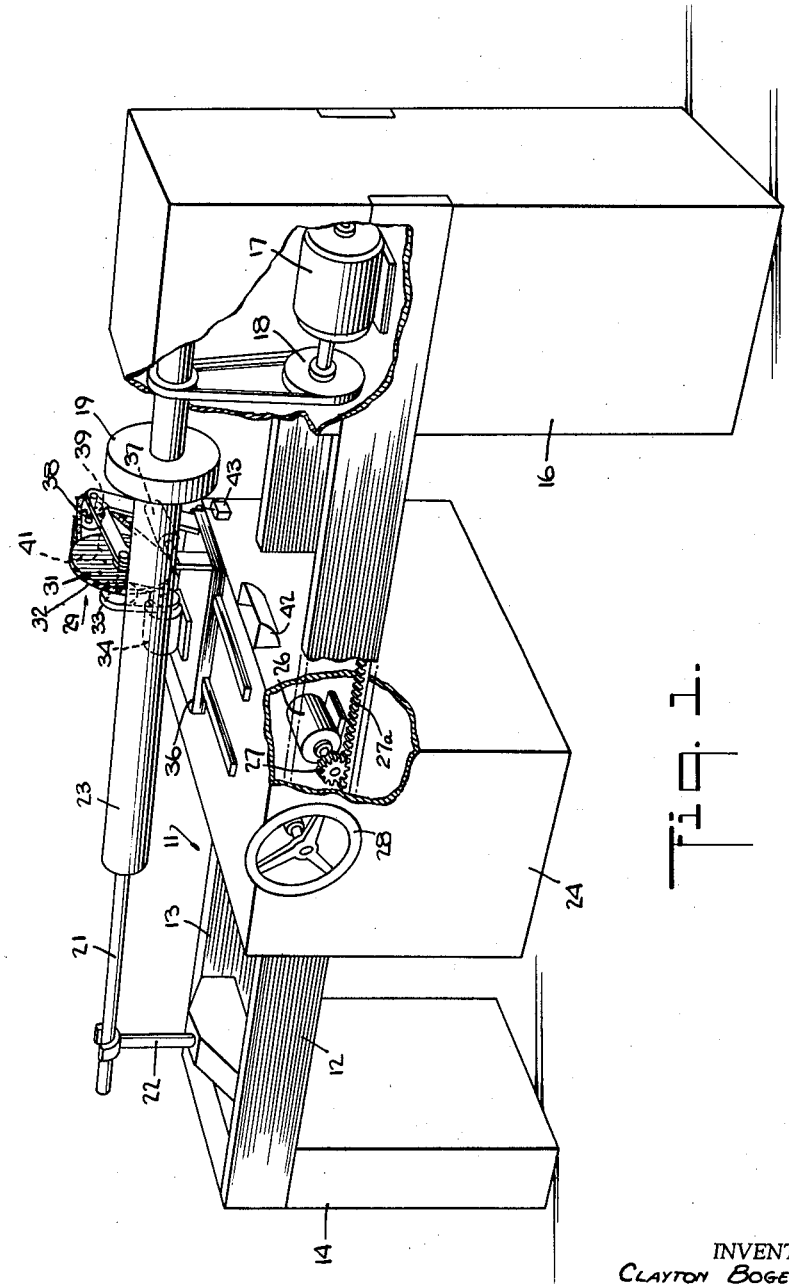

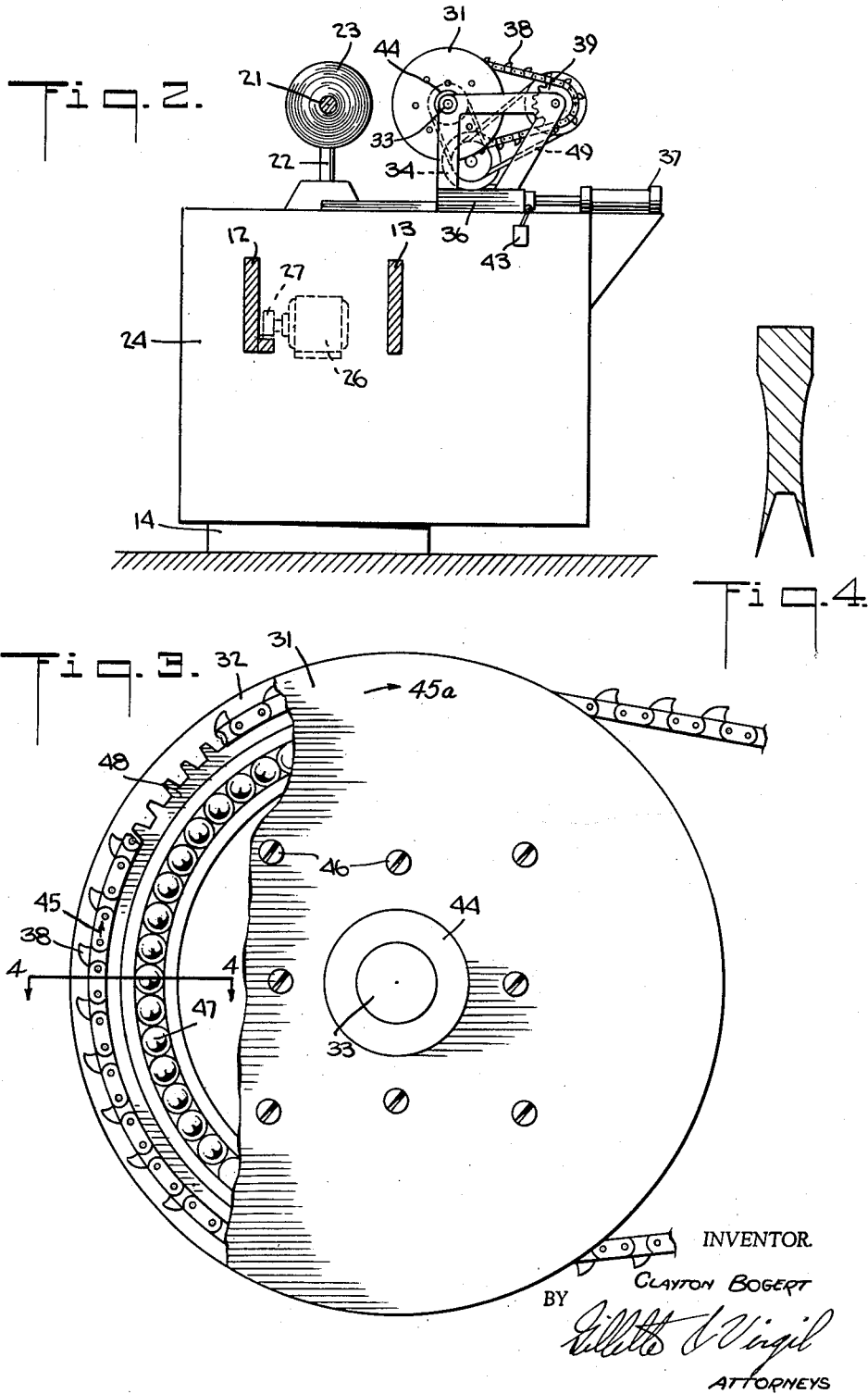

3,148,570
SLITTING MACHINE
Clayton Bogert, 118 Lowell Road, Glen Rock, N.J.
Filed Oct. 25, 1962, Ser. No. 233,062
18 Claims. (Cl. 82—53)

This invention relates to a machine for slicing an elongated roll of material into axially shorter rolls, and particularly to a machine having dual, spaced knife blades with a chain saw between them to remove waste material in order to keep it from interfering with the blades.

It has been the practise heretofore to cut rolls of material by machines having a dual-edged knife blade, which enters the roll of material from one side, and a serrated blade, such as a rotary saw, which enters the roll from the diametrically opposite side and removes the waste material between the two cuts. However, great care must be taken to keep the serrated blade from moving ahead of the knife cuts or from lagging so far behind that waste material clogs up the blade. This is aggravated by variations in the thickness of the rolled material from point to point, or variations in its hardness or the tension with which it is wound or any of the other factors that may introduce inhomogeneities into a single roll. In addition, the matter of tracking the serrated blade exactly with the knife edges may be made more difficult by relative flexing of the serrated blade and the knife, or any of the members that join them together.

In accordance with the present invention the separate, serrated blade is eliminated, together with all of the complicated mechanism that joins it to the knife. The knife has two spaced cutting edges, between which a chain saw runs at a different speed than the peripheral speed of the blades to sweep away the cut material. It may even be desirable to run the saw in the opposite direction in some instances. Both the blades and the saw move into the roll together, and it is desirable, for maximum rigidity of the structure that this motion be rectilinear along a radius common to both the roll of material and the blades.

The invention will be described in greater detail in the following specification together with the drawings, in which:

FIG. 1 is a perspective view of a cutting machine according to the invention;

FIG. 2 is a cross-sectional view of a modified machine similar to that of FIG. 1;

FIG. 3 is an enlarged view, with parts broken away, of the blade and saw shown in FIGS. 1 and 2; and FIG. 4 is a sectional view taken on line 4—4 of FIG. 3 showing the dished shape of the blades greatly exaggerated.

The machine in FIG. 1 is similar to a lathe of which the basic structural components are a bed 11 consisting of two parallel bars 12 and 13, a leg 14 that supports one end of the bars, and a larger leg 16 that supports the other end of the bars. In conventional terminology, the leg 16 is said to be at the head end of the machine and the other leg 14 at the tail end. A small section of the outer shell of the leg 16 has been broken away to show a reversible driving motor 17 and an infinitely variable speed pulley 18 that form part of the driving mechanism to operate a chuck 19 at any desired speed and in either direction.

A mandrel 21 extends through the chuck but does not rotate with it. The other end of the mandrel is supported by a yoke 22. A roll 23 of the material to be cut is supported on a bearing (not shown) which itself rotates on the mandrel. The roll is gripped by the jaws of the chuck 19 to be rotated thereby. As an alternative to the yoke 22, a lathe tailstock may be used to support one end of the mandrel 21.

In the space between the head and tail ends of the machine, and riding or sliding upon the bars 12 and 13 is a carriage 24 which supports the cutting mechanism and most of the other operating components of the machine. The carriage may be moved lengthwise of the bars 12 and 13 in any convenient way, such as by means of a motor 26 and gear 27 that engage a rack 27a on the rail 12, or by any other convenient means, including such well-known devices as a lead screw driven by the motor 17. Furthermore, the carriage 24 may be moved along the rails by means of a manually-operated handwheel 28.

All of the foregoing machine parts are for the purpose of bringing together, in proper cutting relationship, the roll 23 and a knife indicated by reference character 29. This knife has two cutting edges slightly spaced apart which actually are the peripheral portions of two separate blades 31 and 32 affixed to a common axle 33. The latter may be turned by a motor 34, or, if desired, it may be turned by frictional engagement between the cutting edges and the roll 23, or it may even be held stationary when cutting certain types of material, as, for example, soft polyethylene. The roll 23 may itself be rotated in the same direction as blades 31 and 32, or roll 23 may be rotated in the opposite direction to reduce cutting friction.

The knife 29 and its supporting axle 33, as well as the motor 34, are carried by a cross slide 36 that is moved upon the carriage 24 in a direction perpendicular to the axis of the roll 23 and, therefore, perpendicular to the axis of the axle 33, under the force of a piston within a cylinder 37. The piston may be operated by a gas such as air, or a liquid such as oil, either of which may be considered a fluid. Alternative known means of supporting and moving the cross slide may be provided, but the use of a fluid-operated piston, as shown, has the advantage of providing direct action of the knife with the shortest operating links, the most precise control over the path followed by the knife, and, therefore the least flexibility in the knife-controlling apparatus. Flexibility is most undesirable since it raises the possibility that the cutting edges of the knife may be deflected aside, which would produce interferences between the side of the blades and the sides of the cut. Such interferences may lead to destructive heating of the material in the roll 23 or to fouling of one or both of the blades 31 and 32. Perhaps as important as any other aspect of the fluid-operated piston is that it permits direct, rectilinear motion of the knife 29. This permits the knife to be so mounted that the axis of the axle 33 moves directly toward the axis of the roll 23 so that the reverse pressure by the roll as it is being cut acts directly back along the same line as the forward thrust of knife 29 against the roll. Defined in another way, the motion of the blades 31 and 32 under pressure of the piston in the cylinder 37 is along a radial line that is common to both the roll 23 and the blades 31 and 32. The controls of the piston and cylinder 37 are conventional and form no part of this invention.

The present invention is more directly concerned with means for removing the waste material between the blades 31 and 32. As the blades press into the roll 23, there is no need to be concerned about removing this waste material until the first layer or the first few layers have been severed. Thereafter, as the blades push farther into the roll 23, the waste material of previously-cut layers must be removed to prevent fouling the blades. In accordance with the present invention, this waste material is removed by means of a chain saw 38 that fits into the gap between the blades 31 and 32 and moves with respect to the blades to sweep waste material out of the cut. To be more specific, the saw 38 is driven so that the portion of its length which is directly between the blades 31 and 32 moves at a different speed than the peripheral speed of the blades. The saw may be placed on the mechanism so that its teeth face in either direction and it may therefore be driven so that the motion of the saw, which will be in the direction in which the teeth face (see arrow 45), is either in the same direction as the rotation of the blades 31 and 32 (see arrow 45a) or in the opposite direction. The blades commonly rotate between 200 and 600 revolutions per minute, and the speed of the saw 38 will preferably be about 1½ times the peripheral speed of the blades and in the same direction (see arrows 45 and 45a). Thus there will be relatively slow movement between the saw and the blades, but there will still be some movement and enough to assure that waste material is swept out of the cut.

In addition to being looped around the blades 31 and 32, the saw 38 is also looped around a drive sprocket 39 driven by a motor 41. This motor and sprocket are mounted on the cross-slide 36 so as to move with the knife 29.

The machine of FIG. 1 also has certain other features. One is a chip-removal vacuum hose 42 carried by the carriage 24 and so located that its end is directly beneath the area of contact between the knife and the roll 23. In addition, the carriage 24 is provided with a microswitch 43 connected to the carriage drive motor 26 to prevent moving the carriage longitudinally while a cut is being made.

FIG. 3 shows an enlarged view of the knife 29 with parts broken away to illustrate the means for supporting the saw 38 thereon. Both of the blades 31 and 32 are dished slightly outwardly so that the sharp periphery of each blade is also the most distal point of that blade from the other blade except, perhaps for the hub 44 by which the blades are attached to the axle 33. While the blades are spoken of as if they were separate, they are normally joined together, for example by bolts 46, and they may even be formed as a single disc with a deep groove in which the saw 38 runs.

In order to minimize friction, a bearing, here indicated as a ball bearing 47, is located between the blades 31 and 32. The bearing 47 may also have a Teflon layer 48 for further friction reduction, and, if the relative speeds between the knife and the saw are not too great, the Teflon, alone, may be sufficient.

The ends of the teeth of the saw 38 are preferably broad enough almost to fill the gap between the blades 31 and 32 and they extend out almost, but not quite, as far as the cutting edges of the blades. It is not desirable to try to remove each layer as it is cut. For one thing, the material being cut normally has a certain resilience, which causes it to give under pressure of the blades before actually being cut. Thus, if the saw teeth extended out exactly as far as the smooth, round cutting edges of the blades, the teeth are likely to dig into uncut material.

FIG. 2 is a cross-sectional view of a machine similar to that of FIG. 1 except for a modification in the means for driving the saw 38. In FIG. 2, a belt 49 drives the sprocket 39 from the motor 34, but at a different peripheral speed than the blades 31 and 32. In this figure it may be seen that the axis of the axle 33 is at substantially the same height as the axis of the mandrel 21. Thus, horizontal, rectilinear movement of the cross-slide 36 on the flat upper surface of the carriage 24 under pressure from the cylinder 37 causes the blades 31 (not shown in this figure) and 32 to slice directly into the roll 23. Thus the forward thrust of the blades will be along substantially the same radial line as the oppositely-directed pressure of the roll and there will be no force couple tending to twist the blades aside.

As blades 31 and 32 slice into roll 23 and progress towards the center thereof, it may be desirable to change the relative speeds of the roll and the blades to keep the cutting friction therebetween relatively negligible. This may be done by means of a standard speed compensating mechanism which can continuously adjust the relative speeds of the blades and the roll as the cut progresses towards the center of the latter.

While this invention has been described in terms of specific embodiments, it will be obvious to those skilled in the art that modifications can be made in the machines described without departing from the true scope of the invention as defined by the following claims.

What is claimed is:

1. A machine for cutting an elongated roll of material into axially shorter rolls, comprising: means for rotatably supporting an elongated roll of material; means to rotate said roll; a pair of axially spaced, rotatable cutter blades mounted perpendicular to the axis of said roll, said blades being movable along said roll to a selected cutting position and movable toward and into cutting engagement with said roll; sweeper means mounted between said blades for movement relative thereto; independent support means for said sweeper means; and means to move said sweeper means with respect to said blades to remove cut material from between said blades and prevent binding thereof as said blades move through said roll.

2. A cutting machine for slicing an elongated roll of material into axially shorter rolls, said machine comprising: means for rotatably supporting an elongated roll of material; means to rotate said roll; a pair of axially spaced, circular cutting blades rotatably mounted perpendicular to the axis of said roll; means to move said blades with respect to said roll to cut into said roll; a saw in the axial space between said blades; independent support means for said saw; and means to move said saw with respect to said blades to sweep cut material from said axial space.

3. The invention of claim 2, in which said blades are dished slightly outwardly at their outer peripheries.

4. A cutting machine for slicing an elongated roll of material into axially shorter rolls, said machine comprising: means for rotatably supporting an elongated roll of material; means to rotate said roll; a pair of axially spaced, concentrically and rotatably mounted, circular cutting blades movable with respect to said roll to cut into said roll; means to move said blades into said roll along a path which is substantially radial to said roll and to said blades; a saw movable along a circular path in the axial space between said blades; independent support means for said saw; and means to move said saw with respect to said blades to sweep cut material from said axial space.

5. A cutting machine for slicing an elongated roll of material into axially shorter rolls, said machine comprising: means for rotatably supporting an elongated roll of material; means to rotate said roll; a pair of axially spaced, circular cutting blades rotatably mounted perpendicular to the axis of said roll; means to move said blades with respect to said roll to cut into said roll; a chain saw located in the axial space between said blades and movable with respect to said blades to sweep cut material from said axial space; separate support means for said chain saw; and separate drive means for said chain saw.

6. A cutting machine for slicing an elongated roll of material into axially shorter rolls, said machine comprising: means for rotatably supporting an elongated roll of material; drive means for rotating said roll; a pair of axially spaced, circular blades affixed to a common axle for rotation thereon; a chain saw, at least a portion of which is in the axial space between said blades; a first support means for said saw to guide said saw between said blades and along a path in said axial space between said blades along a curvature substantially coaxial with said blades in the region of cutting contact between said blades and said material; a second support means for said saw; means to move said blades with respect to said roll to cut into said roll; and separate drive means for said saw to drive it at a peripheral speed different from that of said blades to sweep cut material out of said axial space between said blades.

7. A cutting machine for slicing an elongated roll of material into axially shorter rolls, said machine comprising: means for rotatably supporting an elongated roll of material; means to rotate said roll; a pair of axially spaced, circular blades rotatably mounted with respect to said roll; a chain saw, at least a portion of which is located in the axial space between said blades; independent support means for said saw; drive means for said saw to provide relative motion between said saw and said blades; and means to move said blades, and the portion of said saw between said blades, into said roll along a path which is substantially radial with respect to both said roll and said blades.

8. A cutting machine for slicing an elongated roll of material into axially shorter rolls, said machine comprising: means for rotatably supporting an elongated roll of material; a pair of axially spaced, smooth edged, circular knife blades mounted with respect to said roll; means on a common axle and rotatable to rotate said blades; a chain saw located, over part of its length, in the axial space between said blades; independent support means for said saw; separate drive means for said saw to provide relative motion between said saw and said blades; and means to move said blades and said saw into said roll along a path which is rectilinear and substantially radial with respect to both said roll and said blades.

9. A cutting machine for slicing an elongated roll of material into axially shorter rolls, said machine comprising: means for supporting and for rotating an elongated roll of material; a pair of axially spaced, circular blades; a common axle parallel to the axis of said roll and moveable axially and transversely, said blades being affixed to said axle; means to rotate said axle; means to move said axle and blades to selected locations along said roll; means to move said axle transversely, while it is rotating, thereby to slice said roll; a chain saw, at least a portion of which is located in the axial space between said blades; a bearing supported by said axle and supporting said chain saw between said blades to permit relative motion between said saw and said blades; a second bearing supporting said saw at a different location; and means for moving said saw at a different peripheral speed from that of said blades to sweep cut material away from the axial space between said blades.

10. A cutting machine for slicing an elongated roll of material into axially shorter rolls, said machine comprising: means for supporting and for rotating an elongated roll of material; a pair of axially spaced, rotatable knife blades mounted perpendicular to the axis of said roll to slice axially-limited sections out of said roll by relative rotary motion between said blades and said roll; means to rotate said knife blades; a chain saw in the axial space between said blades; independent support means for said chain saw; means for driving said chain saw to provide relative motion thereof with respect to said blades and said roll to sweep cut material away; and means to move said blades and said saw transversely with respect to the axis of said roll to effect said slicing.

11. A cutting machine for slicing an elongated roll of material into axially shorter rolls, said machine comprising: means for supporting an elongated roll of material; means for rotating said roll in either direction; a pair of axially spaced, circular knife blades; a common axle parallel to the axis of said roll, said blades being affixed to said axle; means to rotate said axle, and thereby said blades; means to move said axle and blades transversely to the axis of said roll to slice an axially-limited section from said roll; means to move said blades parallel to the axis of said roll; means locking said last-named means from operating when said axle and blades are moving transversely; a chain saw having a plurality of linked teeth and located in the axial space between said knife blades; a bearing supported by said axle and supporting one portion of said saw to cause said teeth to follow a circular path between said blades of slightly smaller diameter than said blades; a second bearing supporting said saw; and means driving said saw to cause said teeth to have a different peripheral speed from that of said blades, said saw moving transversely and axially with said blades to sweep cut material from said axial space between said blades.

12. A cutting machine for slicing an elongated roll of material into axially shorter rolls, said machine comprising: means for rotatably supporting both ends of an elongated roll of material; means for rotating said roll; a pair of axially spaced, circular knife blades mounted for rotation on a common axis and having sharp edges at their axially most distal regions; a bearing in the region between said blades and coaxial therewith; a chain saw supported by said bearing and located between said blades and having teeth with cutting edges facing in the direction of rotation of said blades; second support means for said saw; means to rotate said blades; independent means to move said saw in the same direction as said blades and at a higher speed to sweep away material cut from said roll and between said blades; and means to move said blades with said saw toward said roll to slice said material.

13. The invention of claim 12 in which said blades and said roll turn in opposite directions to reduce cutting friction.

14. The invention of claim 12 comprising compensating means to change the relative speeds of said roll and said blade continuously as the cut progresses toward the center of said roll to keep cutting friction relatively negligible at all diameters of the cut.

15. The invention of claim 12 in which said saw moves at a peripheral speed of approximately one and one-half times the peripheral speed of said blades.

16. A cutting machine for slicing an elongated roll of material into axially shorter rolls, said machine comprising: means for rotatably supporting an elongated roll of material; means to rotate said roll; a pair of axially spaced, circular blades rotatably mounted perpendicular to the axis of said roll; means to move said blades with respect to said roll to cut into said roll; a saw in the axial space between said blades; independent support means for said saw; means to move said saw with respect to said blades to sweep cut material from said axial space; and means to rotate said blades and to hold them at a selected location along said roll while slicing the same.

17. A cutting machine for slicing an elongated roll of material into axially shorter rolls, said machine comprising: means for rotatably supporting an elongated roll of material; means to rotate said roll; a pair of axially spaced, concentrically and rotatably mounted, circular blades movable with respect to said roll to cut into said roll; means to move said blades into said roll along a path which is substantially radial to said roll and to said blades; a saw movable along a circular path in the axial space between said blades and movable with respect to said blades to sweep cut material from said axial space; independent support means for said saw; and common means to rotate said blades and to move said saw on said independent support means at a peripheral speed different from that of said blades.

18. A cutting machine for slicing an elongated roll of material into axially shorter rolls, said machine comprising: means for rotatably supporting an elongated roll of material; means to rotate said roll; a pair of axially spaced, circular blades rotatably mounted perpendicular to the axis of said roll; means to move said blades with respect to said roll to cut into said roll, said blades being rotated by engagement with said roll; a saw in the axial space between said blades; independent support means for said saw; and means to move said saw with respect to said blades to sweep cut material from said axial space.

(References on following page)

References Cited in the file of this patent

UNITED STATES PATENTS

| | | |
|---|---|---|
| 341,895 | Edmunds | May 18, 1886 |
| 939,438 | Nielsen | Nov. 9, 1909 |
| 1,031,175 | Garnett | July 2, 1912 |
| 1,504,703 | Nicholas | Aug. 12, 1924 |
| 2,015,877 | Thompson | Oct. 1, 1935 |
| 2,457,310 | Judelshon | Dec. 28, 1948 |
| 2,691,393 | Jacobs | Oct. 12, 1954 |
| 2,809,333 | Wagner | Oct. 8, 1957 |
| 2,810,187 | Klein | Oct. 22, 1957 |
| 3,053,130 | Nitchie | Sept. 11, 1962 |

FOREIGN PATENTS

| | | |
|---|---|---|
| 167,127 | Great Britain | July 20, 1921 |